United States Patent [19]
Kalagnanam et al.

[11] Patent Number: 6,044,361
[45] Date of Patent: Mar. 28, 2000

[54] FAST INVENTORY MATCHING ALGORITHM FOR THE PROCESS INDUSTRY

[75] Inventors: Jayant R. Kalagnanam, Tarrytown; Ho Soo Lee, Mount Kisco; Mark Elliot Trumbo, Pleasantville, all of N.Y.

[73] Assignee: International Business Machines Corporation, Armonk, N.Y.

[21] Appl. No.: 09/047,275

[22] Filed: Mar. 24, 1998

[51] Int. Cl.[7] .................................................. G06F 17/00
[52] U.S. Cl. ............................................. 705/28; 705/29
[58] Field of Search .......................... 705/28, 8, 7, 22; 364/468.05, 468.09, 468.13

[56] References Cited

U.S. PATENT DOCUMENTS

| | | | |
|---|---|---|---|
| 5,251,290 | 10/1993 | Pabon ....................................... | 395/120 |
| 5,463,555 | 10/1995 | Ward et al. ......................... | 364/468.02 |
| 5,671,362 | 9/1997 | Cowe et al. ............................... | 705/28 |
| 5,691,895 | 11/1997 | Kurtzberg et al. ...................... | 364/148 |
| 5,699,259 | 12/1997 | Colman et al. ...................... | 364/468.05 |
| 5,712,989 | 1/1998 | Johnson et al. ............................ | 705/28 |
| 5,734,592 | 3/1998 | Cox et al. ................................ | 702/179 |
| 5,737,728 | 4/1998 | Sisley et al. ................................. | 705/8 |
| 5,808,891 | 9/1998 | Lee et al. ............................ | 364/468.15 |
| 5,826,236 | 10/1998 | Narimatsu et al. ........................... | 705/8 |
| 5,831,857 | 11/1998 | Clarino et al. ...................... | 364/470.06 |
| 5,841,958 | 11/1998 | Buss et al. ................................ | 345/440 |

OTHER PUBLICATIONS

"Modifying mixed–model assembly line sequencing methods to consider weighted variations for just–in–time production systems," by Cheng et al., Nov. 1996, IIE Transactions, v28, n11, p919(9).

"Tool handling and scheduling in a two–machine flexible manufacturing cell," by Agnetis et al., IIE Transactions, May 1996, v28, n5, p425(13).

"The segmented biderectional single–loop topology for material flow systems," by Sinriech et al., IIE Transactions, v28, n1, p40(15).

"Tool selection for optimal part production: a Lagrangian relaxation approach," by Hsu et al., IIE Transactions, v27, n4, p417(10).

"Dynamic control of imperfect component production for assembly operations," by Gutierraz et al., IIE Transactions, v27, n5, p669(10).

"A parametric maximum flow algorithm for bipartite graphs with applications," by Y. L. Chen, European Journal of Operational Research, v80, n1, p226(10).

"Anew approach to the maximum–flow problem," by Goldberg et al., Journal of the Association for Computing Machinery, v35, n4, p921(20).

*Primary Examiner*—Allen R. MacDonald
*Assistant Examiner*—Forest Thompson, Jr.
*Attorney, Agent, or Firm*—Whitham, Curtis & Whitham; Stephen C. Kaufman

[57] ABSTRACT

A fast computer implemented method generates near-optimal solutions to the multi-objective inventory matching problem by solving for multiple objectives simultaneously and generating multiple non-dominating solutions. The method implements a multi-assignment backjumping algorithm that consists of three steps. The first step is a rappeling step in which a feasible solution is created by applying Iterative Bipartite Matching and maximum flow algorithm. Near-optimal feasible solutions are stored in a non dominated set. The second step is to use a multi-key sort to identify undesirable matches in a given feasible solution. The third step is backlifting the solution by removing undesirable matches from the feasible solution and places those undesirable matches on a no good set of matches. If the feasible solution is non-dominated, a copy is stored in a non-dominated set. The feasible solution is finally provided as input to the repelling step.

6 Claims, 10 Drawing Sheets

SOLUTION=($A_{ML}$, $A_{SL}$, $A_{OL}$), $N_{GL}$

801
FOR ALL $AS_J$ $N_{GL}$
REMOVE $AS_J$ FROM $A_{GL}$

802
REMOVE MATCHES $AM_J^I$ $AS_J$
FROM $A_{ML}$

803
REMOVE ORDERS $AO^I$ APPLIED TO
$AS_J$ FROM $A_{OL}$

FIG. 10

FAST INVENTORY MATCHING ALGORITHM FOR THE PROCESS INDUSTRY

BACKGROUND OF THE INVENTION

1. Field of the Invention

The present invention generally relates to operations planning in a process industry and, more particularly, to a near-optimal inventory matching computer implemented method based on a multi-assignment backlifting procedure.

2. Background Description

Operations planning in a process industry typically begins with a order book which contains a list of orders that need to be satisfied. The initial two steps in an operations planning exercise involves (1) first trying to satisfy orders from the order book using leftover stock from the inventory and (2) subsequently designing manufacturing units for manufacture from the remaining orders. The present invention relates to the first step.

Two important characteristics of a process industry are that the products are manufactured based on the orders not based on a forecast of the expected demand (as in retail or semiconductor manufacturing) and, as a consequence, the inventory is merely the stock of previously produced units which for reasons of quality could not be shipped to the customer.

The first problem of applying orders against an existing inventory has a strong flavor of a matching problem—we call this the Inventory Matching Problem. An inventory of previously produced units could consist of units such as steel slabs in a steel industry or a roll of paper in the paper industry. There is of course wide variation across these units in terms of their weights, grade and surface quality all of which need to be accounted for in doing the match. Additional constraints arise in terms of the weight of the orders and the slabs against which they can be matched. There arise integrality constraints which further restricts the matches that are possible. Further, the number and type of orders that can be applied against a slab is constrained based on various manufacturing considerations. The goal of Inventory Matching is to maximize the total weight of the order book that is applied against the inventory. An additional goal is to minimize the unused weight of those slabs that are matched against orders. The present invention is a fast computer implemented method which provides near-optimal solutions to the Inventory Matching Problem.

3. Problem Description

The order book contains a list of orders that need to be delivered. Each order has a target weight ($O_t$) that needs to be delivered. However, there are allowances with respect to this target weight which specify the minimum ($O_{min}$) and maximum weight ($O_{max}$) that are accepted at delivery. Over and above the total weight (per order) that needs to be delivered there are additional restrictions regarding the size and number of units into which this order can be factorized at delivery. For example, with each order is associated a range for the weight of the manufacturing units which are delivered. Let us assume that the minimum weight for the manufacturing unit is $MU_{min}$ and the maximum is $MU_{max}$. Then for each order we need to deliver an integral number of manufacturing units ($MU_{number}$) of size in the interval $[MU_{min}, MU_{max}]$ so that the total order weight delivered is in the range $[O_{min}, O_{max}]$. In order to fulfill an order, we need to choose a size for the manufacturing unit ($MU_{size}$) and the number of manufacturing units ($MU_{number}$) to be produced such that $$O_{min} \leq MU_{size} \times MU_{number} \leq O_{max}$$
$$MU_{min} \leq MU_{size} \leq MU_{max}, MU_{number} \in \{0,1,2,\ldots\} \quad (1)$$

Notice that the $MU_{number}$ is a general integer variable. Additionally, the constraint represented by Equation (1) is a bilinear constraint.

In addition the weight requirements, each order has four other classes of attributes: (1) The first set pertains to the quality requirements such as grade, surface and internal properties of the material to be delivered. (2) The second set are physical attributes such as the width and thickness of the product delivered. (3) The third set of attributes refer to the finishing process that needs to be applied to the manufacturing units. For example, car manufacturers often require the steel sheets to be galvanized. (4) Finally the fourth set of attributes provide the maximum and the minimum slab size that can be used to produce this order. At first this might sound odd since the decision of how to manufacture slabs to fulfill an order should be left to a manufacturer. It turns out that the maximum and minimum allowable slab size is in fact determined by the manufacturer based on the current technological limitations of process technologies. For example, in a steel mill, all slabs need to be hot rolled to produce units of desired physical dimensions. However, based on the width and thickness required and the quality requirements, the maximum size of the slab that can be hot rolled is constrained, and this determines the allowable maximum allowable slab size. Similar considerations are used to prescribe the minimum allowable slab size.

Associated with each slab in the inventory are two sets of attributes: (1) The first attribute pertains (as in the case of orders) to quality requirements exactly as in the case of orders, and (2) the second case pertains to the physical dimensions of the slab such as the width, thickness and the weight of the slab.

The inventory matching problem requires that we maximize the total weight of applied orders while minimizing the unused portion of the applied slabs, subject to certain constraints that arise out of manufacturing considerations. In the following paragraphs we explain these constraints.

For a given order book, we first assign for each order a set applicable slabs from the inventory. In the general case when we have no restrictions, all slabs can be applied against an order. Let us represent this assignment using nodes for orders and slabs, and arcs to indicate orders and slabs which can be applied against each other. This leads to an undirected bipartite graph from orders to slabs (in the inventory). The graph is undirected because a slab j, applicable to an order i, implies that order i is applicable against slab j. Note that an equivalent representation of this bipartite graph is a matrix of orders as rows and slabs as columns. Each row (corresponding to an order) is a zero/one vector where the ones indicate the applicable slabs. Since the bipartite graph is undirected, this matrix is symmetric. We will consider the upper half of this symmetric matrix.

Two sets of constraints arise as a set of assignment restrictions in terms of the applicable slabs for each order. These assignment restrictions are based on quality and physical dimension considerations.

1. The first restriction is that for a given order only slabs which are of the same quality or higher quality can be applied. If we were to list the orders and slabs in terms of non-decreasing value of quality, then the quality restriction would lead to a staircase structure. Consider the zero/one row for each order; the quality of slabs is improved as we move from left to right. Therefore, once we find a slab of good enough quality, all subsequent slabs are applicable to this order. Therefore, quality restrictions might actually reduce the total number of applicable slabs for any order.

2. The second set of restrictions arise from considerations of width and thickness of the orders and the slabs. Usually, the thickness and width of a slab can be altered using rolling; however, there is a corresponding range which identifies the limits based on machining or rolling considerations. For example, a slab of width $S_w$ and thickness $S_t$ can be rolled to a slab of width in the range $[S_w^{min}, S_w^{max}]$ and thickness in the range $[S_t^{min}, S_t^{max}]$. As long as the order width and thickness requirements fall into this range, the order can be applied against the slab. These consideration further restrict the number of slabs that can be assigned against an order. Notice that this additional restriction does not affect the staircase structure but only makes it sparse.

After incorporating these two restrictions, the order applicability matrix becomes quite sparse, usually about 5% of the entries are non-zero. As a result, these restrictions lead to a more generalized version of the multiple knapsack problem where the assignment restrictions can be specified as a bipartite graph. The conventional multiple knapsack is an instance of this general problem with a complete bipartite graph. The problem that we have outlined so far with the two restrictions outlined above presents another instance with a sparse staircase structure.

The final set of constraints pertain to packing multiple orders on a slab. The assignment restrictions specify a list of orders that can be applied against any slab in the inventory. However, not all orders assignable to a slab can be packed together on the slab. Such packing constraints emerge out of process considerations in the hot and cold mill and the finishing line. Consider a schematic diagram of the route of a slab through a steel mill as shown in FIG. 1.

A slab 10 is sent through a hot strip mill 11 to produce a hot coil 12. The hot coil 12 may be sent through a cold mill 13 (if required) and subsequently to the finishing line 14. After the hot/cold mill, the slab is in form of a sheet or a coil. Before the coils are sent to the finishing line, they are cut according to different order specifications. Since orders with different requirements for the finishing line are cut from the slab before processing, it is possible to pack orders on the same slab. However, cutting coils is time consuming and cumbersome and, most important, the cutting machine is often the bottleneck in the process flow. Hence, often strong constraints are posed in terms of the number of cuts per slab that are allowed based on the current state of the cutting machine. The simplest representation of this constraint is to specify a limit on the number of cuts or the number of different order types (i.e., orders that need to be separated before the finishing line).

In order to represent this constraint more formally, we introduce a color attribute for each order which describes the set of finishing operations required. Orders which require the same set of finishing operations are considered to be of the same type (and hence the same color) and they do not need to be separated before the finishing line. Orders that require different operations in the finishing line are of different type (and hence of different color) have to be separated before the finishing line. Associating a color with each order based on the finishing operations, we can specify a constraint in terms of a limit on the number of different colored orders that are allowed on the same slab. We refer to these process based constraints as the color constraints.

Problem Formulation

Table 1 is a list of notations used in the following problem formulation.

TABLE 1

| | |
|---|---|
| N | Total number of orders |
| M | Total number of slabs |
| $N_i$ | Set of slabs incident to order i |
| $N_j$ | Set of orders incident to slab j |
| $s_j^i$ | Manufacturing unit size of order i obtained from slab j |
| $z_j^i$ | Number of manufacturing units for order i from slab j |
| $C_j$ | Set of colors incident on slab j |
| $N^j$ | Total number of orders |
| $y_j^c$ | 1 if an order(s) of color c obtains material from slab j; 0 otherwise |
| $W_j$ | Weight of slab j |
| $MU_{min}, MU_{max}$ | Minimum and maximum manufacturing unit sizes, respectively, for order i |
| $O_{min}^i, O_{max}^i$ | Minimum and maxinium order weight, respectively, for order i |
| $l_j$ | 1 if slab j is used to supply some order(s); 0 otherwise |

Problem Constraints:

$$\sum_{i \in N_j} s_j^i z_j^i \le W_j l_j \quad 1 \le j \le M$$

$$\sum_{c \in C_l} y_j^c \le 2 \quad 1 \le j \le M$$

$$z_j^i \le \frac{O_{max}^i}{MU_{min}^i} y_j^{c(i)} \quad 1 \le i \le N, \quad 1 \le j \le M$$

$$MU_{min}^i \le s_j^i \le MU_{max}^i \quad 1 \le i \le N, \quad 1 \le j \le M$$

$$y_j^c \in \{0, 1\} \quad \forall c \in C_j, \quad 1 \le j \le M$$

$$l_j \in \{0, 1\} \quad 1 \le j \le M$$

$$z_j^i \in Z_l \quad 1 \le j \le M$$

Problem Objectives:

Maximize applied weight.

$$\sum_{i=1}^{N} \sum_{j \in N_l} s_j^i z_j^i$$

Minimize surplus weight: A unused is accounted for slab j only if we use the slab.

$$\sum_{j=1}^{M} \left( W_j l_j - \sum_{i \in N_j} s_j^i z_j^i \right)$$

A search for a solution to the inventory problem is done in the space of matches (i.e., arcs of the bipartite graph) by creating a solution by instantiating one match at a time. In this context, instantiating a match would imply choosing a $MU_{size}$ an a $MU_{number}$ for the associated match. This search can be either a depth-first, breadth-first or a best-first (especially, if we have a good evaluation function for partial solutions). Therefore, the search progresses iteratively, expanding one match at a time, and then backtracking to cover all possibilities. Such an enumerative search procedure can be represented using tree structure where the intermediate nodes represent partial solutions and the leaf nodes represent complete solutions. Note that a child node is derived from a parent node expanding one match. This tree representation is called a search tree. Clearly, a naive approach to search is exponential. For example, typical problem instances with 200 orders and 100 slabs with an edges density of 5% would have 1000 edges. Assuming that we fix the $MU_{size}$ arbitrarily at $MU_{min}$ and the average number of integer values for $MU_{number}$ on each edge is 5, then we have a search space of $5^{1000}$ which is a very large number and a naive search would return good solutions in limited time only by chance.

Techniques for pruning the search tree can alleviate this problem, provided we have good measures for pruning the search tree. A branch-and-bound technique is commonly used to solve such integer problems by solving a sequence of relaxed solution linear problems which are derived from the original problem For example, if we define a new variable MU on each edge of the bipartite graph such that $MU=MU_{size} \times MU_{number}$ which is only restrained to satisfy the order weight and the slab weight limits, then we have a simpler problem which can be solved as a linear programming problem.

The branching splits a linear program into two subproblems and bounding computes the upper bound for the objective function for each subproblem. If the upper bound for the subproblem is no better than the best integer solution found so far, then the entire subproblem is pruned from the search space. A branch-and-bound process can be represented by a tree, where every node in the tree represents a subproblem. Initially, the tree is initiated with a single root node which represents a relaxed problem where both variables ($MU_{size}$, $MU_{number}$) on the edges of the bipartite graph are relaxed and replaced by the relaxed variable MU. At each stage of the branch-and-bound search, one active node is selected and the associated relaxed problem is solved. Depending on the solution, one of the following three actions is taken:

Pruning: If the relaxed problem has a solution that is worse than the current best feasible objective value, prune the node.

Updating: Update the integer solution if the solution is such that for each edge the $MU_{size}$ and the $MU_{number}$ satisfy the constraints described in Equation (1).

Branching: Branch on some edge in the bipartite graph if the relaxed solution does not satisfy the restrictions in Equation (1) and if its objective value is better than the current best feasible solution.

Shortcomings of Traditional Search Based Approaches

The several shortcomings of these approaches for solving the Inventory Matching Problem are:

1. The first shortcoming of such an approach is that there is no guarantee of convergence. Therefore, often for large problems (with over a few hundred edges) the branch-and-bound approach is not able to find feasible solutions/matching.
2. Because of incremental approach to searching the space of matches, the speed of this algorithm depends critically on how close the actual optimal solution is to the relaxed solution generated by the linear program. For the inventory matching problem, both the integrality constraints on the $MU_{number}$ and the color constraints render the relaxed problem to be a rather loose approximation to the actual problem. Hence, the branch-and-bound algorithm is very slow (a couple of hours) for even moderate sized (less than 100 edges) problems. Such a response time is not acceptable in real world situations where the entire production plan (of which the inventory matching is a small part) has to be done within a couple of hours.
3. Finally, the branch-and-bound algorithm can optimize for only one objective at a time. The Inventory Matching Problem has two major competing objectives—maximize applied quantity and minimize partial surplus. In order to solve for both these objectives, the algorithm has to be applied once for each objective by constraining the other objective at some desirable goal. This procedure is repeated until no further improvement in both objectives can be achieved. Since the algorithm response for each objective is slow, such a goal programming approach is too slow for real world applications.

SUMMARY OF THE INVENTION

It is therefore an object of the present invention to provide a fast computer implemented method which can solve the multi-objective matching problem.

It is another object of the invention to provide an computer implemented method that can solve for multiple objectives simultaneously and generate multiple non-dominating solutions.

According to the invention, there is provided a near-optimal computer implemented inventory matching method based on multiple assignments per iteration. The method implements a multi-assignment backjumping algorithm that consists of three steps. The first step is a rappeling step in which a feasible solution is created by applying an Iterative Bipartite Matching on a given initial solution. Near-optimal feasible solutions are stored in a non dominated set. The second step involves improving the solution by solving a max flow problem. The third step is to use a multi-key sort to identify undesirable matches in a given feasible solution. The fourth step is backlifting the solutions by removing the undesirable matches from the feasible solution and placing those undesirable matches in a no good set of matches. If the feasible solution is non-dominated storing, a copy of it is stored in a non-dominated set and the feasible solution is provided as input to the repelling step.

The novel features of the computer implemented inventory matching method according to the invention include the following:

The method quickly creates near-optimal solutions.

With multiple objectives, the method creates non-dominated solutions.

Unlike traditional branch-and-bound techniques or their equivalents, the method uses iterative bipartite matching algorithms with repetitive multiple assignments and unassignments.

A max flow formulation is able to exploit the flexibility in the $MU_{size}$ to improve the quality of the solutions.

The use of multi-key sorting to identify undesirable matches and for backlifting solutions.

Because of its fast performance, the method can be used in real-world inventory matching problems.

Problem Representation

The inventory matching problem can be graphically represented using a bipartite graph as shown in FIG. 2. The orders and slabs are shown as nodes of this graph and the arcs represent the applicable matches. Note that each arc in this graph represents two decision variables; the $MU_{size}$ and the $MU_{number}$. $MU_{size}$ is a continuous variable that can take any value within the range specified by Equation (1). $MU_{number}$ is a general integer variable. Initially, $MU_{number}$ is unassigned.

The inventory matching problem is implemented on a computer using lists. There three parallel representations which prove to be useful:

1. The inventory problem can be represented as a list of applicable matches, $M_L$. Each element $M_i$ of the list $M_L$ corresponds to an edge in the bipartite graph and hold pointers to a unique order $O_i$ and a slab $S_i$ which can be applied against each other.
2. Another representation for this problem is using a list of orders, $O_L$. Each element $O_i$ of list $O_L$ is an order (from the order book) and has associated with it a list of applicable matches from $M_L$. These applicable matches for $O_i$ can be used to identify the corresponding slabs applicable to it.
3. The last representation consists of a list of slabs $S_L$ available in the inventory. Each element $S_i$ of $S_L$ is a slab and associated with it a list of applicable matches from $M_L$. These applicable matches for $S_i$ can be used to identify the corresponding orders applicable against it.

A solution of the inventory application problem can be graphically represented using a bipartite graph as before; however, now we only show those edges which have been selected to apply orders against slabs. Orders and slabs that do not have an applied edge against them are dropped from this representation. In other words, only edges whose $MU_{number}$ has been assigned a value is represented in the bipartite graph.

Additionally, corresponding to the list representations above for the initial problem, a solution ca be represented with a parallel list of applied matches, orders or slabs:
1. A solution constitutes of an applied match list $AM_L$. Each element $AM_i$ also belongs to the list $M_L$ but has associated with it a value for $MU_{number}$ and $MU_{size}$. Therefore, a solution can be represented by a subset of $M_L$ with associated assignments.
2. Another representation consists of an applied order list $AO_L$. Each element $AO_i$ also belongs to the list $O_L$ and has associated with it a list of applied matches.
3. Finally, the solution is also represented using a list of applied slabs $AS_L$. Each element $AS_i$ also belongs to the list $S_L$ and has associated to it a list of applied matches.

BRIEF DESCRIPTION OF THE DRAWINGS

The foregoing and other objects, aspects and advantages will be better understood from the following detailed description of a preferred embodiment of the invention with reference to the drawings, in which:

FIG. 10 is a flow chart showing the backlifting process used in the process of FIG. 5.

DETAILED DESCRIPTION OF A PREFERRED EMBODIMENT OF THE INVENTION

Figure 1:
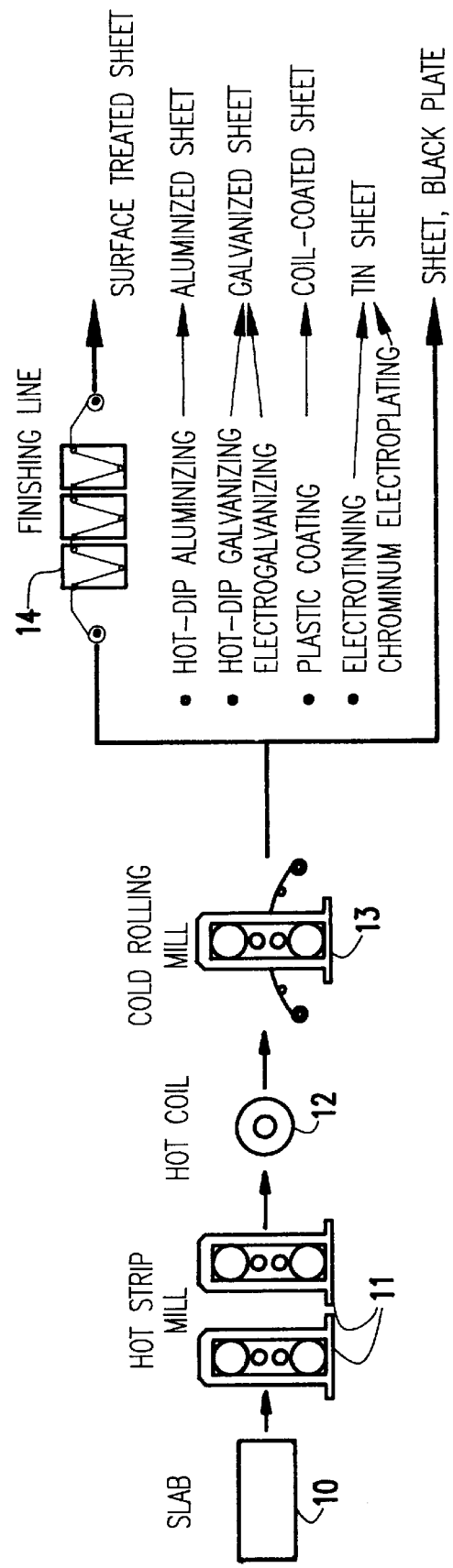
FIG. 1 is a schematic block diagram of a steel mill as an illustration of an industrial process for which the invention was developed.
Figure 2:
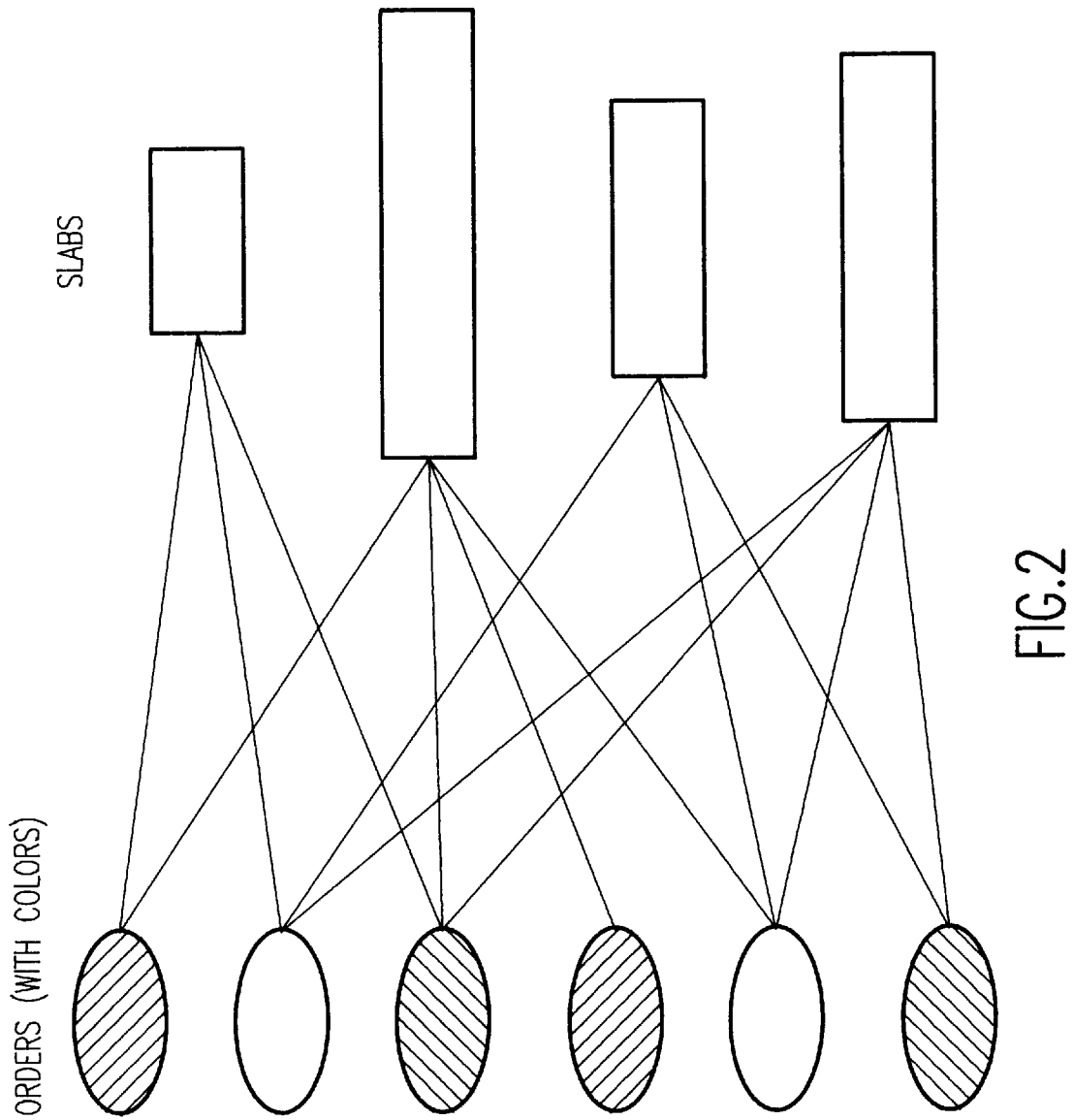
FIG. 2 is bipartite graph which illustrates the inventory matching problem solved by the invention.
Figure 3:
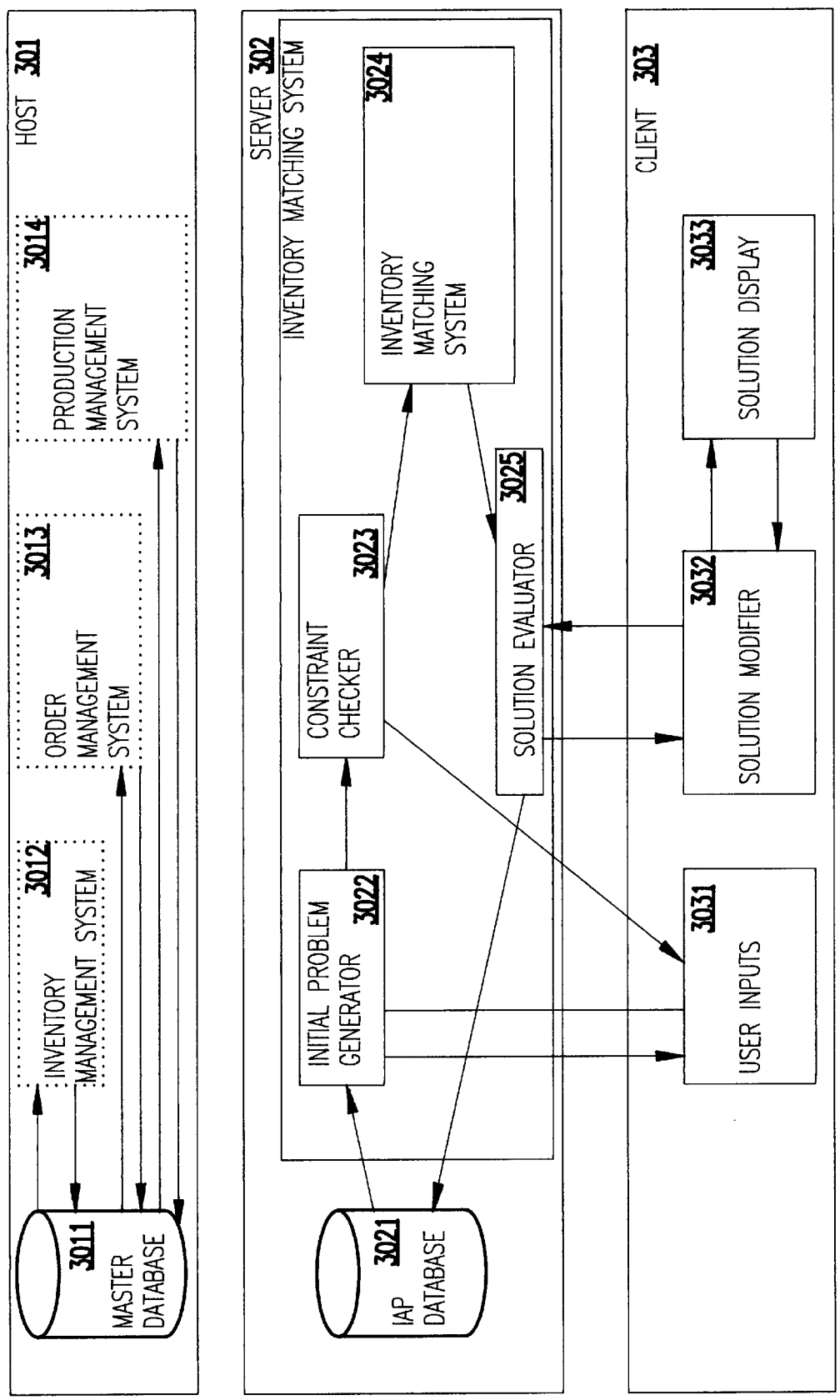
FIG. 3 is a block diagram illustrating the hardware on which the invention may be implemented.

Referring again to the drawings, and more particularly to FIG. 3, there is shown in block diagram form a computer system on which the method according to the invention may be implemented. The invention described herein can be implemented, in a preferred embodiment, as a multi-tier client-server architecture. The host 301 may consist of a large computer system such as an IBM System 390 mainframe, an IBM AS400 minicomputer or IBM RS6000 workstation or, alternatively, the process may be implemented to run on a 16-WAY IBM SP2 machine with AFS for storage. The SP2 is a collection IBM RS6000 engines running under a common umbrella and the AIX operating system (IBM's version of the UNIX operating system) and connected with a high speed switch. The server of this architecture is a centralized repository of all data, maintains the data and performs computationally-intensive operations. The server 302 can be realized by any large-scale computer system such as discussed before. The client area 303 of the architecture may consist of a network of personal computers (PCs) and network computers (not shown as specific units). The server side functions to display information as a means of transmitting messages to the server for performing specific tasks described below. Both the host 301 and the server 302 contain large databases each of which is preferably stored on a very large direct access storage device (DASD), from which data can be extracted and updated using a Structured Query Language (SQL) based database program, such as for example the widely available IBM DB2 database program.

With continued reference to FIG. 3, the main database 3011 resides on the host server 301. This database stores the total inventory via an inventory management system 3012, and the order book via an order management system 3013. The main database interacts with the inventory application database 3021 in the server 302 to exchange data about the inventory and the order book as well as solutions generated by the inventory matching system. The main database communicates to the order management system 3013 the final solution and the production management system 3014 provides application instructions to the shop floor.

The server 302 contains the IAP database 3021 and the inventory application system. The inventory application system contains an initial problem generator 3022 which extract the relevant part of the inventory and the order book. The constraint checker 3023 checks the data for various constraints provided by the user via the user interface in the server 303. The problem specification is then passed to the inventory matching system 3024 which generates a solution. This solution is then avaluated for multiple objectives with input from the user 3025. The final solution(s) accepted by the user are then communicated to the IAP database 3021.

The client 303 provides user interface function. The main modules here deal with selecting the constraints to tailor the problem specification, according to user inputs 3031 and the solution selector/modifier 3032 which allows the user to evaluate solutions from the inventory matching system and select or modify solutions appropriately. A graphical interface is provided by the solution display 3033.

The fast computer implemented method implemented on the hardware platform described above is a heuristic search algorithm. The search is conducted in a space of matches (or edges of the bipartite graph). The algorithm generates feasible solutions rapidly by assigning multiple edges in each iteration. These feasible solutions are subsequently refined by undoing multiple poor matches to jump to nodes on the search tree which represent partial solutions. These partial solutions then become the root node for the subsequent search. Since both the forward step and backtracking step are fast and create multiple assignments and unassignments, this computer implemented method returns near-optimal feasible solutions quickly.

Figure 4:
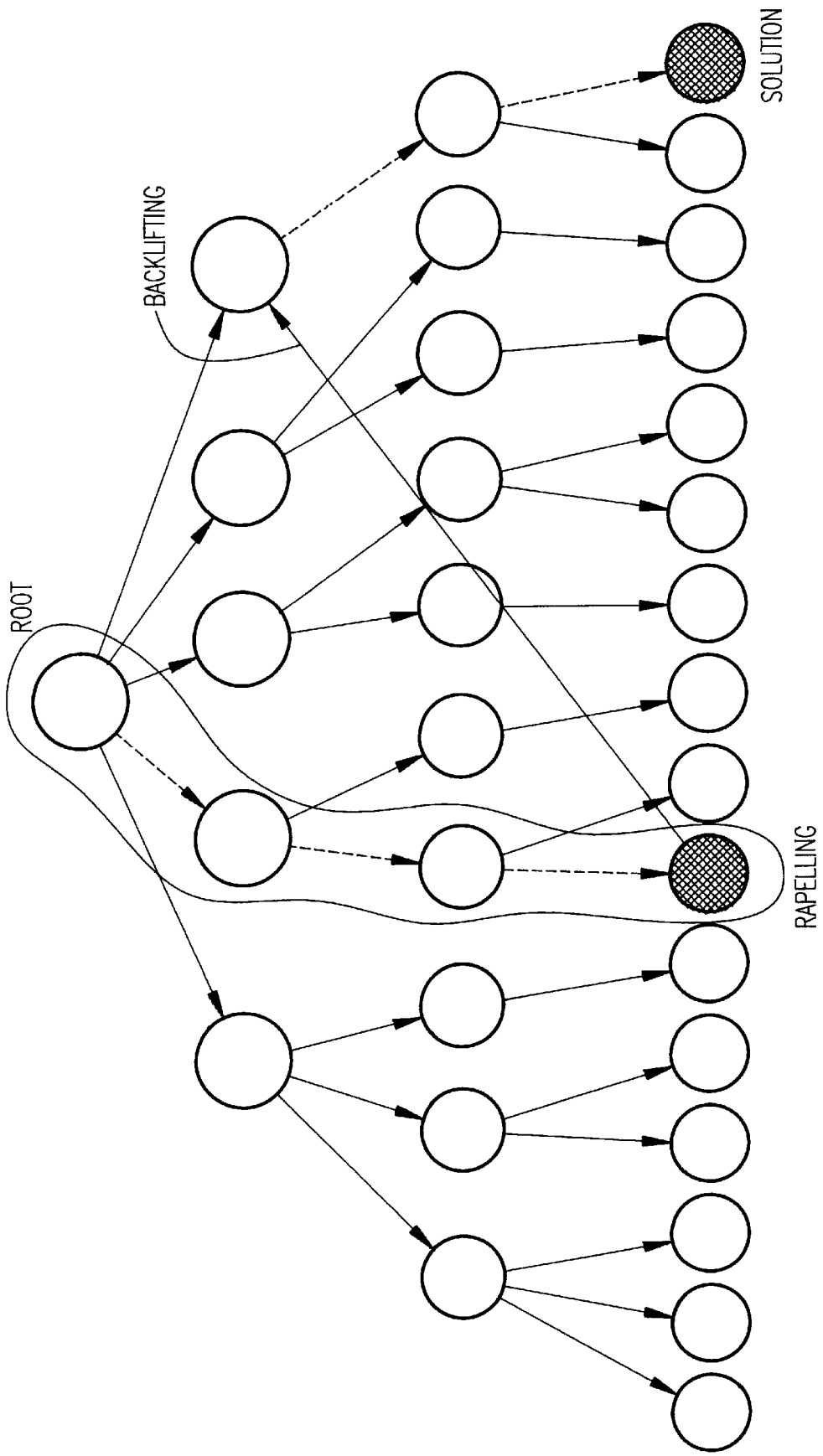
FIG. 4 is a search tree illustrating the multi-assignment based backjumping algorithm implemented according to the invention.

We instantiate several matches at once thereby rappeling down the search tree along a particular branch. We identify several matches at once using the assignment problem which provides a lower bound for the solution. Moreover, a single application of the weighted bipartite matching algorithm (assignment problem) provides only a partial solution (i.e., we are only halfway down the search tree) and we need to apply this iteratively until we generate a complete solution. However, after each application of the assignment problem, we use a constraint checker to prune out the inapplicable matches in the bipartite graph. This solution is subsequently improved by exploiting the flexibility in $MU_{size}$ through the use of a max flow algorithm. Once a complete solution is generated, it is evaluated for multiple objectives such as applied quantity and partial surplus using a multi-key filter and, based on this evaluation, a subset of the matches are marked as undesirable. The search then backlifts the solution to a point in the search tree where the state of the solution is such that the undesirable matches have not been applied. This entire process of rappeling down the search tree and then backlifting the solution to different point (and maybe branch) of the search constitutes one iteration in the search and is illustrated in FIG. 4. This search is continued until several non-dominating solutions are found or the algorithm times out. Note that at each iteration a feasible solution is generated and in this sense the approach is "anytime".

Figure 5:
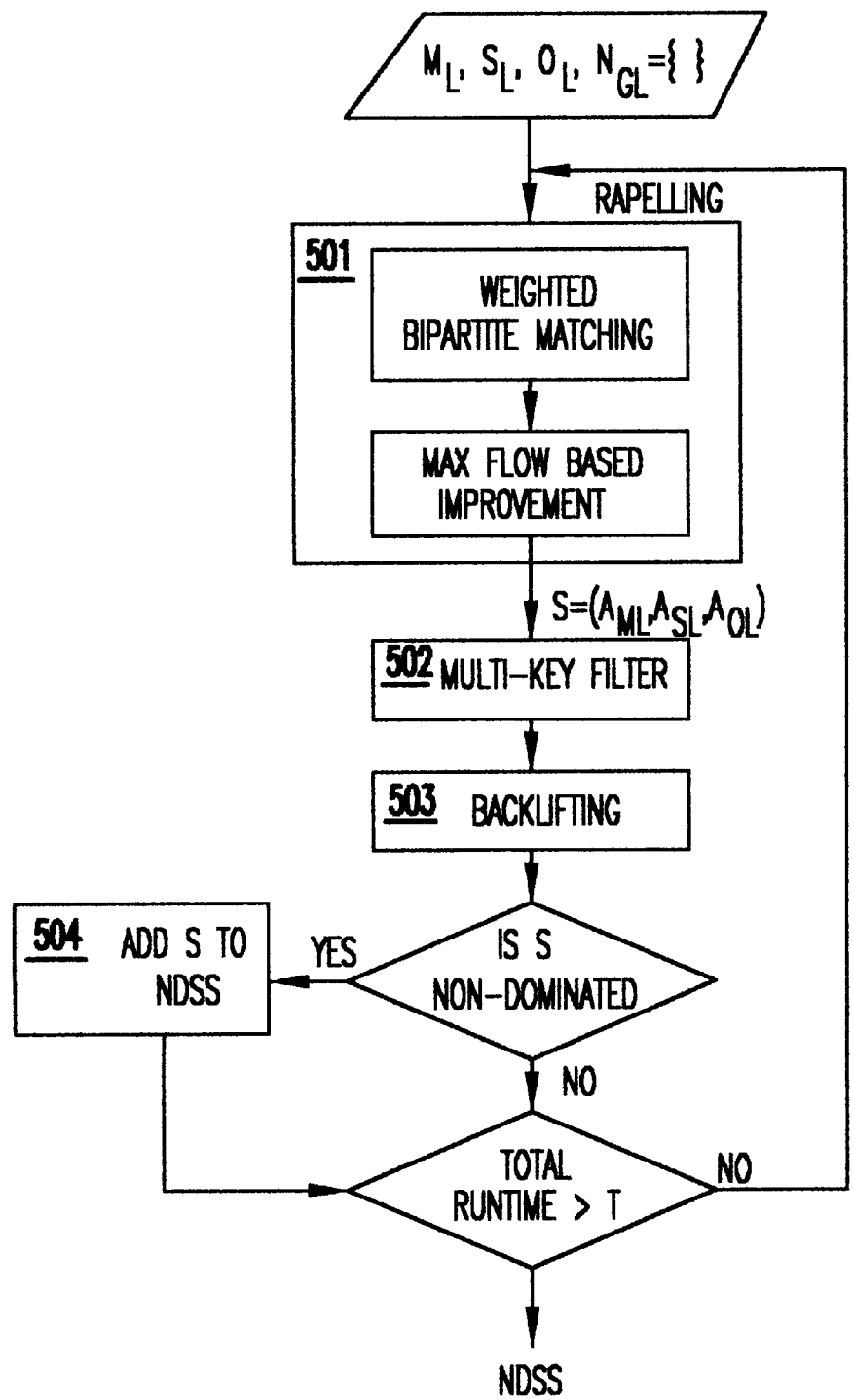
FIG. 5 is a flow chart illustrating the overall logic of the computer implemented method according to the invention.

The multi-assignment backjumping algorithm consists of three main steps as illustrated in the flow chart of FIG. 5. With reference to both FIGS. 4 and 5, the first step in function block 501 is rappeling. In this step, a feasible solution is created by applying Iterative Bipartite Matching on a given initial solution. The feasible solution is improved using a max flow algorithm to decrease the surplus on all applied slabs. If the feasible solution is near-optimal, store solution in a non dominated set. The second step in function block 502 is to apply a Multi-Key Filter. That is, a multi-key sort is used to identify undesirable matches in a given feasible solution. The third step in function block 503 is BackLifting. In this step, undesirable matches are removed from the feasible solution to create a partial solution. Then, the solution is backlifted (see FIG. 4) to the position of the partial solution in the search tree. The process then loops back to function block 501. Note that the partial solutions generated after filtering and backlifting represent potential non-dominated solutions and are added to a set (NDSS in function block 504).

Iterative Bipartite Matching

Figure 6:
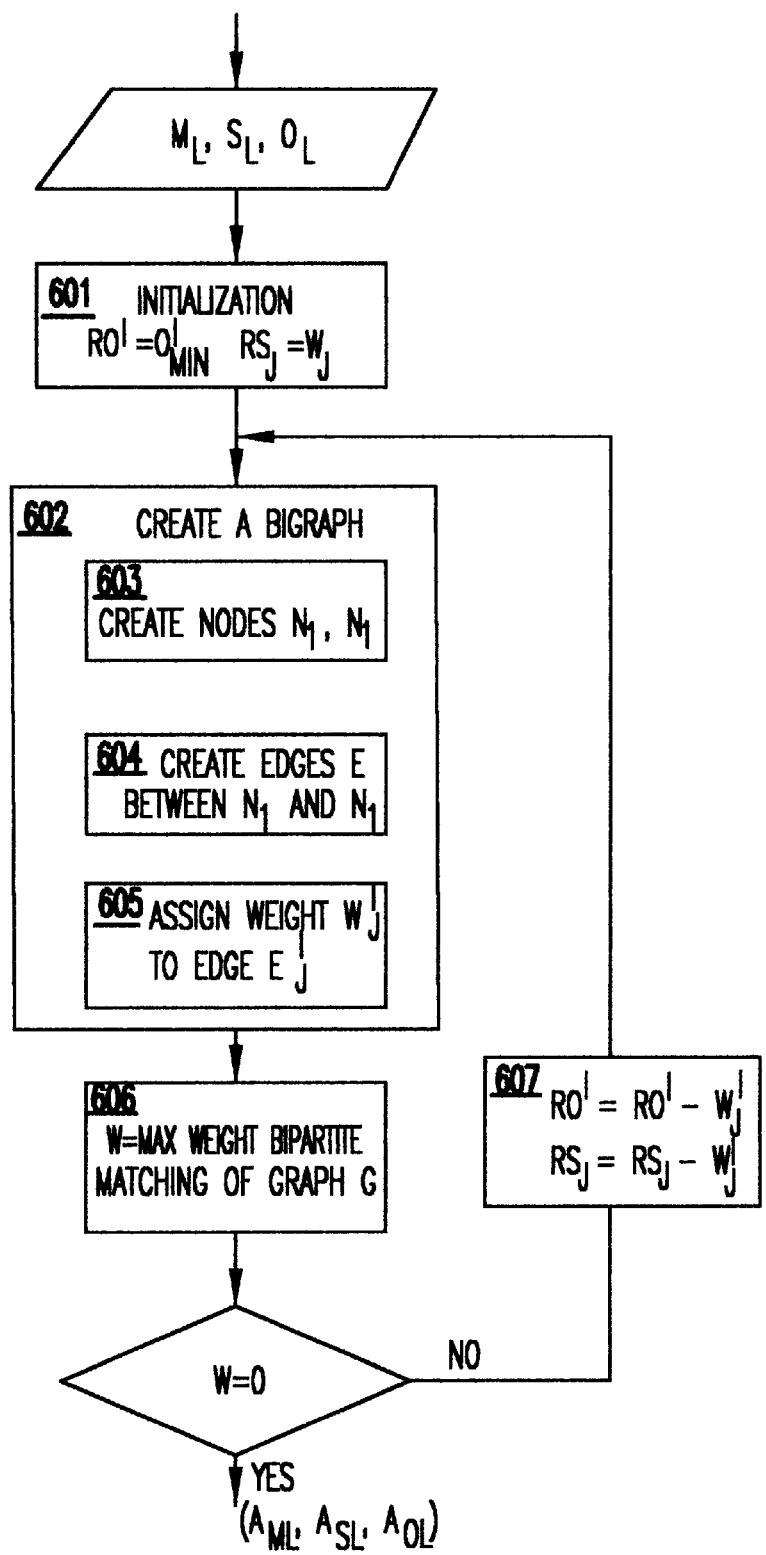
FIG. 6 is a flow chart showing the process of the Iterative Bipartite Matching used in the rappeling step in FIG. 5.

This step in function block 501 is shown in more detail in FIG. 6. This step iteratively finds maximum weight bipartite matchins between assignable orders and slabs. The weight for an (order, slab) edge in the bipartite graph (FIG. 4) is the maximum of weight from order which can be assigned to the slab. Note that for each iteration after the second interation, the graph has to be reconstructed to take into account the color constraints.

With reference to FIG. 6, the first step in function block 601 in the process is initialization. Let $RO^i$ denote the remaining weight for order i and $RS_j$ denote the remaining weight of slab j. Set $RO^i = O_{min}^i$ and $RS_j = W_j$. The second step at function block 602 is creating the bipartite graph. This is done by creating an edge weighted bipartite graph $G = N_1 \cup N_2, E$) as follows: The nodes $N_1$ denote the fulfilled orders while the nodes $N_2$ denote the slabs which are not full, in function block 602. Check for color consistency: Check if a given order can be assigned to a given slab. For example, if a slab already has orders of two different colors, say $c_1$ and $c_2$ assigned to it, all remaining orders eligible to be assigned to the slab must have color $c_1$ or $c_2$. If order i can be assigned to slab j, we introduce an undirected edge e=(ij) in G, in function block 604. The set of these edges forms the edge set, E, of the graph.

The third step 605 in function block 603 is to evaluate weight the edges of the graph G. Weight the edges of G as follows:

1. Let $RW_j^i = \min\{ROi, RSj\}$.

For an order node $i$ and a slab node $j$, if $\left\lceil \dfrac{RW_j^i}{MU_{max}^i} \right\rceil = \left\lceil \dfrac{RW_j^i}{MU_{min}^i} \right\rceil$, then $RW_j^i = \left\lceil \dfrac{RW_j^i}{MU_{max}^i} \right\rceil MU_{max}^i.$ 2. $number = \left\lceil \dfrac{RW_j^i}{MU_{max}^i} \right\rceil \cdot size = \dfrac{RW_j^i}{number}.$ The weight for edge $e = (i, j)$ is $w_j^i = size \times number$.

The next step shown in function block 606 is matching. In this step, a maximum weight bipartite matching found in the graph G. If the total weight of the matching is zero, the process stops. Else, for each matched edge e=(i,j), assign $w_j^i$ units of order i to slab j. Decrease the $RO^i$ and $RS^j$ by $w_j^i$ The process then returns to function block 602.

Max Flow Analysis

After applying weighted bipartite matching (WBM), we have the following situation: Some orders have been completed (WBM was able to assign the order to one or many slabs) while some orders are partially complete. That is, there exists some amount of the order which has not been assigned to any slab. Also, there might exist orders which are not applied at all (i.e., no amount of the order is applied to any slab).

Figure 7:
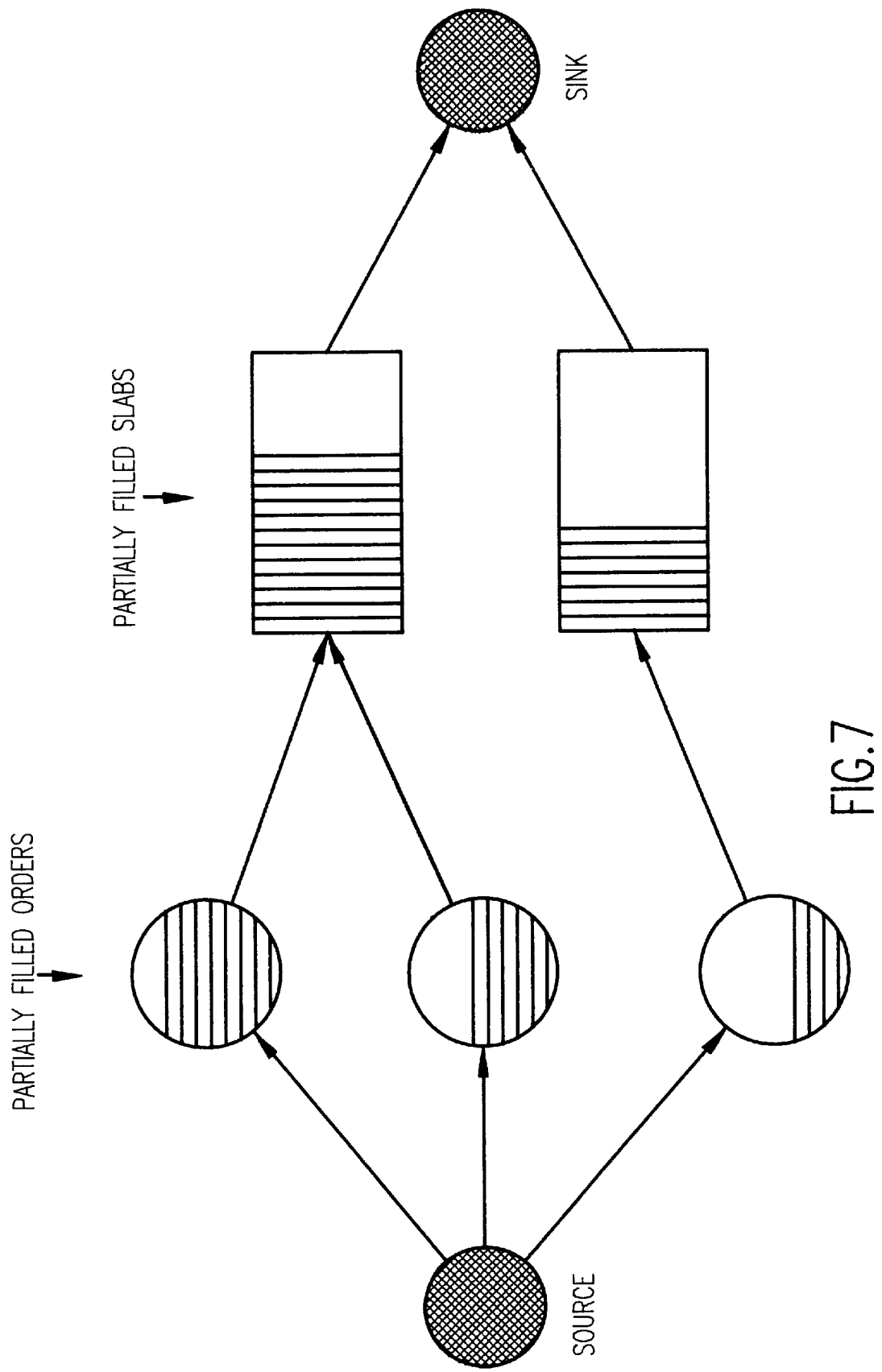
FIG. 7 is a flow network to illustrate the max flow analysis.

In an effort to improve on the result of WBM by increasing the applied weight of partially complete orders and also decrease the partial surplus of the slabs, we apply the max flow algorithm to a flow graph constructed from the partially filled orders and slabs. FIG. 7 shows three partially filled applied orders and the corresponding slabs. As shown in the figure, we construct a network by adding a source node and a sink node. The source is connected to all the partially filled orders, while all the partially filled slabs are connected to the sink.

Figure 8:
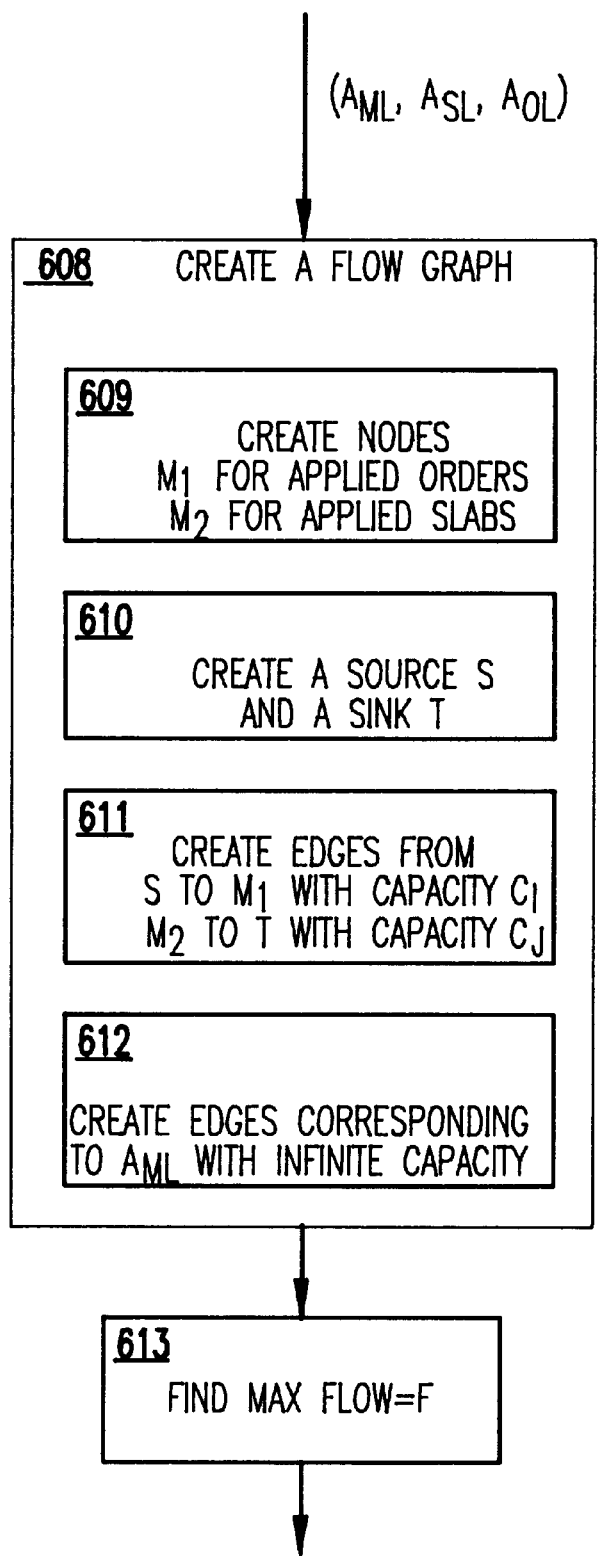
FIG. 8 is a flow chart showing the process of max flow used in the rapelling step in FIG. 5.

FIG. 8 is a flow chart illustrating the construction and use of a network flow graph for refining the solution created by WBM. Function block 608 denotes the aggregate function of creating the flow graph. Within this block there are four steps. The first step shown in function block 609 is the creation of nodes $M_1$ for the unfilled orders and $M_2$ for the unfilled slabs. The next step shown in function block 610 represents the creation of a source node s and a sink node t. These nodes $M_1$ and $M_2$ are joined in a network in function block 611 where edges are created from the source s to all the unfilled orders $M_1$ and from unfilled slabs $M_2$ to sink node t. The capacities of the arcs are determined as follows:

Capacity of an arc from the source to an order i (say) is $C_i=\min\{(PU_{max}^i-PU_{size}^i)\times PU_{number}, O_{max}^i-AO^i\}$. We now explain the reasons for choosing this value for the capacity: First, we do not wish to change $PU_{number}$ since it is restricted to be an integer. Changing the $PU_{number}$ would involve obeying the integrality restriction which would make this step hard to solve. So, we choose to change the $PU_{size}^i$. Note, again, that at the end of step 1, for a partially filled order i, the applied weight $AO^i=PU_{number}\times PU_{size}^i$. Also, the maximum allowable value for $PU_{size}^i$ is $PU_{max}^i$. Hence, keeping $PU_{number}^i$ to be the same, the maximum additional order weight which can be applied for order i is $(PU_{max}^i-PU_{size}^i)\times PU_{number}$. However, $O_{max}^i-AO^i$ is the total order weight remaining to be applied to order i. The minimum of these two quantities is then the bound on the capacity of the arc.

Capacity $C_j$ of an arc from a slab (say j) to the sink is equal to the partial surplus $ps_j$ of that slab.

Capacity of each arc from an order to a slab is (shown in function block 612).

Having constructed the network with the above capacities on its arcs, we then find a maximum flow from the source to the sink in function block 613. In this step, we restrict ourselves only to partially filled orders (and ignore orders which have not been applied at all) because of the color constraints. That is, the maximum flow algorithm does not account for the color constraints and hence if we allow orders which have not been applied at all, it is possible that the algorithm assigns these orders such that the color constraints are violated.

Multi-Key Filtering

Figure 9:
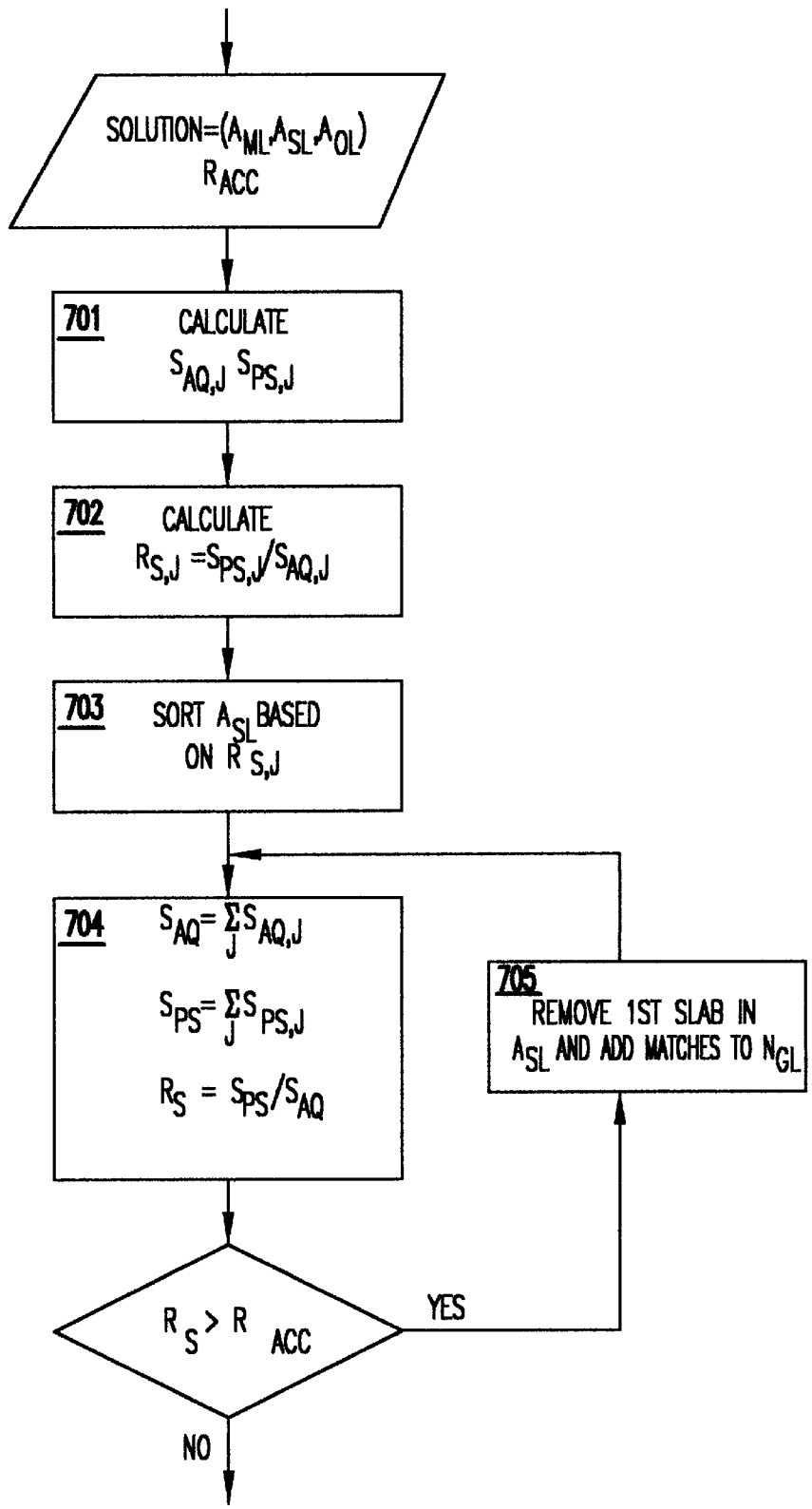
FIG. 9 is a flow chart showing the process of the multi-key sort used in the process of FIG. 5.

A solution generated by the rapelling function block has two attributes: (i) The quantity of orders applied to slabs, and (ii) the partial surplus weight. Both these attributes are evaluated on a slab by slab basis since associated with each slab is a list of orders applied against it. The multi-key filtering (function block 502 in FIG. 5) is shown in FIG. 9 and uses the two objectives as attributes for filtering slabs which perform poorly against these attributes.

A given solution is evaluated in terms of the cumulative applied quantity and partial surplus for all the applied slabs. The quality of a given solution is measured in terms of the ratio of the total partial surplus to the total applied quantity. An acceptable ratio $R_{acc}$ is specified exogenously to indicate the tradeoff between the objectives. The multi-key filter uses this ratio $R_{acc}$ to refine a solution. With reference to FIG. 9, the multi-key filter which expects as input a solution and $R_{acc}$ begins in function block 701 where, for a given solution, the applied quantity ($S_{AQj}$) and the partial surplus ($S_{PSj}$) for each applied slab j are found by summing over all applied orders on a slab. Next, in function block 702, the ratio ($R_{Sj}$) of the partial surplus to the applied quantity for each slab is determined. The list of applied slabs is sorted in decreasing order of $R_{Sj}$ in function block 703. In function block 704, the total applied quantity and partial surplus for the entire applied slab is evaluated by summing over all applied slabs, and the aggregate ratio $R_S$ is calculated. While $R_S>R_{acc}$, the first slab list is popped and removed, in function block 705. This slab list is stored with the corresponding applied matches in a list of no good matches ($L_{NG}$). The process then loops back to function block 704.

BackLifting

The final step (function block 503 in FIG. 5) consists of return the search to an appropriate point in the search tree from where the iterative assignment can be reapplied. This step is rather straightforward and is illustrated in the flow chart of FIG. 10. It takes the list of no good matches $N_{GL}$ generated by the multi-key filter and removes the corresponding matches from the list of applied matches in the solution. This generates a partial solution which is then provided to the iterative bipartite matching step.

Applications

As a vehicle for testing our computer implemented method, we have solved over twenty inventory problems from a leading steel plant. We compared the performance of our computer implemented method with the branch-and-bound algorithm for these problem instances. The twenty instances had sizes ranging from ten edges in the bipartite graph up to 3000 edges.

The first result we found was that the multiple assignment based algorithm is able to find non-dominating sets of solutions within a few minutes for all instances. This is in stark contrast with the branch-and-bound method which does not converge to any solution ever when we ran it for many hours. This result demonstrates that conventional techniques cannot be used in real situations where the day-to-day operations for inventory matching depend on the results from optimization algorithm. In comparison the approach according to this invention provides an excellent approach for generating multiple feasible solutions even for large instances within a few minutes.

In addition, we compared the quality of the results obtained from the multi-assignment algorithm with the traditional branch-and-hound approach which provides optimal solutions. The comparisons were done for small instances (edges less than 100) for which branch-and-bound was able to converge to a solution. We found that the solutions generated by the multi assignment algorithm were within 5% of the optimal solutions.

In summary, the new computer implemented method according to the invention is able to solve large problem instances of the matching problem in a few minutes. The quality of the results when compared against the optimal for small solvable instances indicate that they are within a few percent. Extensive testing of the multi-assignment algorithm in the context of a large steel maker indicate the viability of this approach for large real world inventory matching problems.

Other applications of the invention include the paper and metal industries, which are similar to the steel industry in that the inventory contains a large amount of unfinished items which are finished according to the order against they are applied. Hence, one of the key operations in such industries is once again to apply an order book against the inventory constrained by processing constraints so as to maximize the amount of the order book satisfied and to minimize the waste. The method described herein can be directly applied to these inventory matching problems universally across the paper and metal industries.

Another application of the invention pertains to companies doing business on the Internet. The Internet is a new avenue through which inventories can be offered simultaneously and anonymously to a large number of potential buyers. Likewise, an Internet site that posts a wide selection of current offerings can be come a centralized source for those in the market for surplus inventory.

Typically, production planning is preceded by inventory application in an effort to maximize the use of surplus inventory against the order book at a given plant. This traditional notion of an existing inventory at a given plant location can be greatly expanded by Web trading. Any manufacturer can in essence build a virtual inventory (let us call this "vInventory") over the Internet by collecting all the surplus inventory that is made available at the electronic trading posts.

The critical question that arises in the face of such possibilities is how should any manufacturer decide which inventory items are profitable to buy based on a given order book at any given point of the planning horizon. The method described herein can be used to match the order book against a virtual inventory built over the Internet. Inventory items (on the Internet) which are profitably matched against the order book can be bought or bid for.

Thus, while the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A computer implemented method for quickly finding multiple non-dominated near optimal inventory matching results comprising the steps of:

creating a feasible solution by applying iterative bipartite matching on a given initial solution and a no good set of matches, wherein the no good set of matches is initially empty;

refining the feasible solution to decrease unused weight using max flow analysis;

using a multi-key sort to identify undesirable matches in the given feasible solution;

backlifting the feasible solution by removing the undesirable matches from the feasible solution and placing the removed undesirable matches in a no good set; and if the feasible solution is near optimal, storing the feasible solution in a non dominated set and providing a copy of the feasible solution as input to the iterative bipartite matching step.

2. The computer implemented method recited in claim 1 wherein creating a feasible solution comprises the steps of:

creating an edge weighted bipartite graph, said graph comprising nodes corresponding to unfilled orders, nodes corresponding to slabs with unused weight, and edges corresponding to feasible matches avoiding the set of no good matches;

setting each edge weight of the graph using a monotone function of a feasibly applicable order weight and a resulting unused weight of the slab; and performing a maximum weight bipartite matching of the edge weighted bipartite graph.

3. The computer implemented method recited in claim 1, wherein refining the feasible solution using max flow analysis comprises the steps of:

creating a flow graph comprising a source node s and a sink node t, intermediate nodes representing unfilled orders, intermediate nodes representing slabs with unused weight, edges corresponding feasible matches avoiding the set of no good matches with a very large flow capacity, edges from source nodes to order nodes with a feasible capacity based on unfilled order quantity, and edges from slab nodes to the sink node with a feasible capacity based on unused slab weight; and finding a maximum flow from the source node to the sink node.

4. The computer implemented method recited in claim 1, wherein using a multi-key sort comprises the steps of:

determining a ratio of unused weight and applied quantity for each slab;

sorting slabs in a non-decreasing order of the ratio; and identifying a set of n slabs whose aggregate ratio does not exceed a prespecified limit.

5. The computer implemented method recited in claim 1, further comprising the step of providing application instructions, where the instructions may be used by a shop floor manager in decision making.

6. The computer implemented method recited in claim 1, further comprising the step of displaying the feasible solution in graphical form on a display device.

* * * * *